(12) United States Patent
Lauwers et al.

(10) Patent No.: US 7,867,072 B2
(45) Date of Patent: Jan. 11, 2011

(54) ROTOR TINE AND ROTARY ELEMENT CONFIGURATION FOR CROP RESIDUE TREATMENT SYSTEMS

(75) Inventors: Andrew V. Lauwers, Stevens, PA (US); Nathan E. Isaac, Lancaster, PA (US); Martin J. Roberge, Saskatoon (CA); Jason M. Benes, Mount Joy, PA (US)

(73) Assignee: CNH America LLC, New Holland, PA (US)

( * ) Notice: Subject to any disclaimer, the term of this patent is extended or adjusted under 35 U.S.C. 154(b) by 6 days.

(21) Appl. No.: 12/381,617

(22) Filed: Mar. 13, 2009

(65) Prior Publication Data

US 2010/0229520 A1  Sep. 16, 2010

(51) Int. Cl.
*A01F 12/40* (2006.01)
(52) U.S. Cl. .................................... 460/112
(58) Field of Classification Search ............. 460/112, 460/111, 901, 119; 56/16.4 R, 504, 503, 56/505, 341; 241/32, 166, 292
See application file for complete search history.

(56) References Cited

U.S. PATENT DOCUMENTS

| | | | |
|---|---|---|---|
| 4,637,406 A | | 1/1987 | Guinn et al. |
| 5,913,724 A | | 6/1999 | Roberg |
| 5,974,776 A | * | 11/1999 | Prellwitz ............ 56/504 |
| 6,152,820 A | | 11/2000 | Heidjann et al. |
| 6,594,983 B1 | | 7/2003 | Krone et al. |
| 6,595,123 B2 | | 7/2003 | Schrag et al. |
| 6,679,041 B2 | * | 1/2004 | Viaud et al. ............ 56/341 |
| 6,692,351 B2 | | 2/2004 | Johnson et al. |
| 6,699,121 B2 | | 3/2004 | Bognár et al. |
| 6,729,953 B2 | | 5/2004 | Bueermann |
| 6,802,176 B2 | | 10/2004 | Gaudreault |
| 6,886,312 B1 | * | 5/2005 | Inman et al. ............ 53/527 |
| 6,912,835 B1 | | 7/2005 | Chabassier |
| 7,484,350 B2 | * | 2/2009 | Benes et al. ............ 56/504 |

(Continued)

FOREIGN PATENT DOCUMENTS

JP  9187152  7/1997

*Primary Examiner*—Árpád Fábián-Kovács
(74) *Attorney, Agent, or Firm*—Michael G. Harms; Patrick M. Sheldrake

(57) ABSTRACT

A rotor tine construction for a rotary element of a crop residue treatment system for effecting improved transport of crop residue along a material flow path and, if a counter knife assembly is spaced from the rotary element across the material flow path, for also effecting improved shear cutting of such crop residue by the knife elements of the counter knife assembly and more efficient operation of the crop residue treatment system, which rotor tine construction includes a base portion generally mountable to the rotary member of the rotary element, at least one rotor tine extending outwardly from such base portion and including three distinct blade edges, one of which forms a trailing edge and the other two of which are upper and lower edge portions forming a leading edge, with the lower and upper edge portions configured and intersecting with one another to form a notch-like indentation along the leading edge at an intersection point P defined to be the point of cut contact position, such that, as the rotary member rotates forwardly the rotor tine is rotated through the material flow path to engage and concentrate engaged lengths of crop residue near intersection point P for an improved cut as such material is moved past the knife elements of the counter knife assembly.

25 Claims, 8 Drawing Sheets

U.S. PATENT DOCUMENTS 7,694,504 B1 * 4/2010 Viaud et al. .................. 56/341
2008/0264028 A1 * 10/2008 Woodford ................ 56/16.4 R
2009/0025358 A1 * 1/2009 Woodford .................... 56/364
2009/0100814 A1 * 4/2009 Egging et al. .................... 56/1

* cited by examiner

ROTOR TINE AND ROTARY ELEMENT CONFIGURATION FOR CROP RESIDUE TREATMENT SYSTEMS

TECHNICAL FIELD

This invention relates generally to crop residue treatment systems and to agricultural equipment and machines that have such systems therewith for effecting the movement of such crop residue and for optionally also rendering crop residue provided thereto into smaller pieces, and especially to crop processors and impact chopper assemblies that have a rotary element or portion, including crop rotor tines arrayed therealong and thereabout, and a counter knife assembly that may be positioned generally parallel to such rotary element such that the rotor tines rotate past the knife elements of the counter knife assembly to interact therewith and to so advance the crop residue passing between the rotary processor element and the counter knife assembly to effect a shearing cut of the crop residue as it passes the counter knife assembly, and even more particularly to an improved rotor tine configuration and arrangement that facilitate improved and more uniform throughput of the crop residue.

BACKGROUND ART

Various pieces of agricultural equipment employ crop residue treatment systems of several types that, among, other things, move and process crop residue, sometimes referred to as material other than grain (MOG), in various ways and often pulverize or cut or chop such crop residue into smaller portions during the equipment operation. Among such pieces of agricultural equipment are balers of various types, including round balers, square balers, and large square balers, as well as various types of combines, to name but a few.

In the operation of a typical baler, crop residue is moved and processed to form the residue into a desired shape such that, preferably, the crop residue that is included within the desired, resultant shape is so packaged that the bale is of a desired density. Various balers are designed to provide baled material in the shapes and densities that best fit the requirements of the end users. Often, in order to meet the desires or requirements of users, especially relative to the desired density of the bales, the crop residue material must be cut or chopped into smaller or finer pieces before it is formed into the bale. To accomplish such cutting or chopping, the crop residue treatment systems of balers have often included systems of various designs positioned directly in front of the baling chamber of a baler and configured to cut or chop the crop residue into smaller pieces as the crop residue is being provided to the baling chamber.

For somewhat similar, but distinct, purposes, crop residue treatment systems of various designs have also been employed with or as part of agricultural combines to move and process crop residue as it moves through such combines. In the operation of a typical agricultural combine that employs a threshing rotor, the crop residue that is generated during operation of the combine must be dealt with in some manner, typically by distributing it onto or over a field, often after being cut or chopped into smaller pieces before such distribution.

Historically, many combines have employed crop residue treatment systems that have included residue conveyance systems, sometimes referred to as beaters, at the rear of the threshing rotor to pull the residue away from the threshing rotor and to convey such crop residue to separate rearmounted choppers and/or spreaders, sometimes referred to as hood mounted choppers, that act to chop and/or spread the crop residue provided thereto onto and over the field. With such system, users could, if they so desired, turn the chopper off to forego chopping action and/or bypass, or route the material flow around, the chopper portions of such systems to effect conveyance and distribution of the crop residue without chopping.

Often, however, the hood mounted choppers have been employed and so operated not only to convey the crop residue resulting from a harvesting operation but to also pulverize or cut or chop it into finer pieces and to spread the resulting crop residue mix onto and over the field. Typically, such hood mounted choppers have taken the form of what is sometimes referred to as a flail chopper, and the systems of which they are a part have evolved to the point that they may include over 100 flail knives on a rotating chopper, mounted within a dedicated housing that provides an appropriate environment for the operation of the rotating chopper so as to best maximize its performance. In order to be able to effect a spread of the chopped material over a width of up to about 40 feet, which width generally corresponds to the cut width of the header, the rotating chopper of such a residue management system has often operated at or above 3000 RPM so as to provide suitable and sufficient energy to the chopped material.

In an effort to provide greater equipment versatility while reducing equipment complexities, an alternative residue treatment management technology was also developed for use with combines, which technology incorporated into the harvester a multifaceted construction that was capable not only of fulfilling the primary purpose of transporting the crop residue away from the threshing system but also of treating such crop residue in varying manners dependent upon the desires of operators. Such constructions came to be known as integral choppers or integral chopper or chopping systems due to the integration of a chopping function, in addition to the primary transport function, into the combine and its operations. Such integral chopper systems, because of their positioning within the combine and their functional capabilities, offered a versatility not generally available with the hood mounted chopper systems.

Such integral chopper systems have been so designed that, as noted hereinabove, their primary function has been the transport of material away from the threshing system and a secondary function has been the treatment of such material as it is being so transported. Such operations have usually been effected in one of two different ways. Most commonly, the integral chopper system has been operated to transport the material from the threshing system to a spreading system as a rotary processor element or portion rotates at or near 3000 RPM so as to quickly move the material rearwardly and to also chop it into smaller pieces as it is being so transported. Less commonly, the integral chopper system has been operated to more gently transport the material from the threshing system to a spreading system as the rotary processor element operates at a much slower speed, typically at only about 800 RPM or less, with less chopping activity. In the former instance, the desire and expectation has been that the material will be transported and that the shortest mean length of cut will be realized to allow for modern minimum tillage applications while the chopping is accomplished using as little power as possible. In the latter instance, the desire and expectation has been that the material will be transported in such a manner as to provide longer and less damaged straw.

In general, existing integral chopper systems operate such that, as the flow of crop residue after threshing is discharged from the combine rotor and moves through the crop residue treatment and distribution system, it flows between the rotary element of the integral chopper assembly and the chopper grate assembly thereof. With the tines of the rotary element having sharpened and/or serrated and/or scalloped edges, when the stationary knife assembly is in an engaged position, as the crop residue is being moved and propelled rearwardly the interaction of the processor tines and the knife elements of the stationary knife assembly chop such crop residue into smaller pieces as such residue passes between the rotary element and the stationary knife assembly. The rotational movement of the rotary element, typically at or near 3000 RPM, serves not only to propel the resultant flow of crop residue further rearwardly, but also to effect an impact cutting of the material encountered by the tines and the knife elements of the stationary knife assembly. If the stationary knife assembly is positioned to a fully retracted position, the crop residue passing between the rotary chopper element and the chopper grate assembly is moved rearwardly by the action of the rotary element, with lessened, but still significant, chopping activity occasioned by the sharpened rotor tines. If the rotary element is rotated at a substantially lower speed, such as about 800 RPM instead of 2000-4000 RPM, somewhat larger and longer pieces of residue, with less damage thereto, can be transported rearwardly.

In general, it was found that such dual and alternative transport operations of the integral chopper systems could best be realized by employing knife elements fixedly or rigidly mounted to or on the rotary member, as opposed to flail-type elements that could be mounted to lugs on the rotary member so as to be free to rotate about such lug connections, and by the use of blade elements that had a sharpened edge to efficiently and effectively cut or chop the residue, as opposed to blunt bars for beating or pulverizing such residue, as the residue passed between the rotary chopper element and the chopper grate assembly.

Some users, however, desired that straw be effectively and even more gently transported rearwardly, with even less chopping and at lower speeds. Some of such integral chopper systems were therefore designed to be re-configurable to operate at still slower speeds, as crop processors, with blunt edged tines replacing the sharpened and/or scalloped tines. In such events, when the stationary knife assembly is in an engaged position, as the crop residue is being moved and propelled rearwardly, the blunt edged tines function to move such crop residue, with little or no impact cutting thereby, past the knife elements of the stationary knife assembly such that larger pieces of crop residue are cut into smaller pieces by the shearing action of the knife elements as the crop residue is being moved past such knife elements.

If the stationary knife assembly is positioned to a fully retracted position, however, such as might be desirable with some crops and/or for some residue, the crop residue passing between the rotary element and the chopper grate assembly is moved rearwardly by the action of the rotary element and the blunt edged tines thereof, with minimal chop. If the rotary chopper element is rotated at the low speed such as is desired for a crop processor, such as about 300 RPM, longer pieces of residue, with considerably less damage thereto, can be effectively transported rearwardly.

Unfortunately, such re-configuration of an integral chopper system to function more as a crop processor, and reverse re-configuration to return such system to the status required for operation as an integral chopper system, has generally been inconvenient, cumbersome, and time consuming, as a consequence of which most integral chopper systems are not designed to be so re-configurable and users seldom engage in re-configuration efforts even with those systems that may be so re-configurable.

Crop residue treatment systems of such various types have been effectively employed for their intended purposes for a number of years.

While such systems have taken somewhat differing forms, depending upon the particular pieces of agricultural equipment with which they have been utilized, as well as the desires of users and manufacturers, many of such systems have had certain commonalities or have exhibited similarities in their designs and operations, as a consequence of which various of such systems may sometimes be identified or referred to as being of certain general types. Included among such types of such crop residue treatment systems are certain systems that operate at relatively low speeds, hereinafter generally referred to as crop processors, and other systems that operate at considerably higher speeds, hereinafter generally referred to as impact chopper or impact chopping systems or assemblies, both of which types of crop residue treatment systems generally operate to convey crop residue and both of which may also be operated to, in general, cut or chop the crop residue being processed into smaller pieces.

In general, the systems that are identified as crop processors typically operate at lower rotational speeds, often less than 400 RPM, and employ blunt edged tines on a rotary member to contact and move the crop residue through the equipment, while the systems that are identified as impact chopping systems operate at considerably higher speeds, often in the range of 2000-4000 RPM, and employ rotor tines that have sharpened and/or scalloped and/or serrated edges on a rotary member to contact and move the crop residue through the equipment while also cutting into and chopping the crop residue upon impact therewith. Both crop processors and impact chopping systems often also include counter knife assemblies past which the crop residue being processed is conveyed in order to effect additional cutting or chopping of the crop residue, but the counter knife assemblies can often be retracted from the crop residue flow path if users desire to forego the use thereof.

Many of such crop processors and impact chopper assemblies employ like or similar components and exhibit certain similarities. Typically, many include a residue treatment assembly that has a rotary component or element disposed laterally within a housing extending generally horizontally across the flow path of the crop residue through the housing, as well as a counter knife assembly extending generally parallel to and spaced from the rotary element.

The rotary element of such residue treatment assembly, sometimes referred to a rotary chopper element, typically includes a cylindrical tube or like member having a plurality of rotor tines distributed therealong, oftentimes disposed in rows and columns, though sometimes in differing array configurations.

The counter knife assembly typically includes a chopper grate assembly spaced below and extending generally parallel to the rotary element and a knife mounting assembly positioned generally beneath the chopper grate assembly.

The chopper grate assembly of such a counter knife assembly typically includes a grate portion having a plurality of holes or transverse slots spaced along its length. At least in integral chopper assemblies, such holes or transverse slots are typically sized so that smaller pieces of crop residue, which may include un-separated grain, are able to pass therethrough and enter the combine cleaning system, at least when such holes or slots do not have other elements positioned therein or extending therethrough or are not otherwise been obstructed.

The knife mounting assembly of such a counter knife assembly typically includes bar-like elements or components, positioned generally below the chopper grate assembly, extending in a fixed end-to-end arrangement with a plurality of spaced blade elements along the portion of the bar-like element generally facing the rotary chopper element, which blade elements are aligned with slots in the grate portion of the chopper grate assembly. Such blade elements and slots in the grate portion of the chopper grate assembly are generally coordinately sized and configured to permit the blade elements to be insertable into the slots to at least partially project therethrough when the knife mounting assembly is disposed in certain positions.

Often, the counter knife assembly has associated therewith an adjustment mechanism that is operable to vary the spacing between the grate portion of the chopper grate assembly and the knife mounting assembly, as well as the degree of projection of the blade elements of the knife mounting assembly through the slots of the grate portion, as may be desirable depending upon the crop being harvested. Such an adjustment mechanism operates to move the knife mounting assembly between a fully engaged position with the blade elements of the knife mounting assembly extending through the slots towards the rotary chopper element and a fully retracted position in which the blade elements are fully withdrawn or retracted from the slots, and typically is also operable to adjustably vary the position between a fully engaged and fully retracted position.

A counter knife assembly of such general construction, whether or not the knife mounting assembly thereof has the capability of being adjustably repositionable relative to the grate portion by an adjustment mechanism, is often referred to as a stationary knife assembly. Such nomenclature has been considered appropriate since such knife mounting assemblies, though perhaps adjustable to some extent to vary the distance between the rotary chopper element and the knife mounting assembly, such as by movement of the knife mounting assembly relative to the grate portion of the chopper grate assembly and the slots thereof, often in an arc-like movement about an offset axis parallel to both the rotary chopper element and the longitudinal axis of the knife assembly mounting, remain in essentially fixed or stationary positions during the chopping operation of the residue chopper assembly once they have been adjustably moved to a given position.

With such constructions, when the counter knife assemblies are withdrawn or retracted, the rotor tines thus rotate with the rotary element to effect movement of the crop residue through the flow path between the rotary element and the grate portion of the counter knife assembly. With the crop processor, the blunt edged rotor tines, rotating at a relatively low speed, contact and move the crop residue through the flow path with relatively little damage to the crop residue, as a consequence of which the lengths of crop residue can be passed relatively whole and uncut. With the impact chopping system, the sharpened and/or serrated edges of the rotor tines, rotating at a considerably higher speed, impact and chop through the impacted crop residue as the crop residue is being conveyed through the flow path, as a consequence of which the resulting crop residue is cut or chopped into smaller lengths.

When the counter knife assemblies are positioned to extend through the slots in the grate portion as the rotary element is rotating, the rotor tines cooperate with the blade elements of the knife mounting assembly to both propel the residue rearwardly and to effect a cutting or chopping of the residue as it passes between the rotary chopper element and the chopper grate assembly. With crop processors, the blunt edged rotor tines compress the crop residue material as it is being conveyed past the fixed knife assembly at relatively low speeds, which action results in a shearing of the compressed crop residue material by the blade elements of the fixed knife assembly and in the conveyance rearwardly within the equipment of crop residue of shorter lengths. With impact chopping systems, the sharpened and/or serrated rotor tines, rotating at speeds often in the range of 2000-4000 RPM, cut into, yet also move, the crop residue rearwardly past the blade elements of the fixed knife assembly to effect a co-operative cutting or chopping of the crop residue into considerably smaller lengths.

Relative to the present discussion, the significant distinctions between such systems have resided in the differing aspects of the rotor tines, i.e., blunt versus sharpened edges, and in the speeds of operation.

For the most part, despite the commonalities and similarities between systems, balers have employed crop processors, operating at relatively low speeds, while harvesters have employed impact chopper assemblies, operating at considerably higher speeds, for effecting the desired cutting of crop residue. Both baler users and harvester users have, however, continued to seek improvements in the operations and efficiencies of their respective crop residue treatment systems, with baler users desiring, among other things, the ability to obtain throughput crop residue that is better aligned and of a more uniform cut length for baling, and with combine users desiring, among other things, a system that is optionally operable both at lower speeds and with less damage to the crop residue, such as for windrowing, and at higher speeds, yet with sufficient cutting capability, such as for distribution of crop residue over a field.

In such regards, baler users have desired that the throughput of the crop processors be increased to provide better efficiency. However, increases in rotational speed of the rotary element have often resulted in feeding issues and in reduced cut quality, due, in part, to difficulties associated with the manner in which crop residue material has been moved through the crop processor to be sheared by the knife elements of the counter knife assembly, as a consequence of which most crop processors in the industry have been limited to operational speeds of about 100-300 RPM. Moreover, as the crop residue material has been provided to such a crop processor, those larger and longer pieces have been presented in a haphazard configuration, with only a small percentage of the longer pieces being aligned generally parallel to the axis of the rotary processor element. Consequently, as the longer pieces have been moved past the knife elements of the stationary knife assembly, the shearing cuts of the non-aligned longer pieces of crop residue material have often been angled relative to the thickness of such longer pieces, rather than being generally transverse to the thickness, as a consequence of which system loading has been higher than was desirable and the resulting smaller pieces of crop residue material have been of less uniform length than was desirable. Additionally, because some sliding movement could occur along the knife elements as the longer pieces were being moved past them, the angled cuts could also have some curvature thereto, resulting in a further increase in system loading.

Harvester users, on the other hand, have desired a crop residue treatment system that could be employed at the location of an integral chopper assembly and which could sometimes be operated at a relatively low speed for transporting crop residue from various crops, such as straw, through the harvester with limited cutting and for windrowing, yet which could at other times be used with other crops, perhaps at somewhat higher speeds, to efficiently and effectively cut the crop residue into smaller pieces for distribution over a field. Replacement or conversion of the impact chopping systems, with their sharp-edged rotor tines, so that they could occasionally function more akin to beaters has been problemsome, and reversals of the replacement or conversion actions have generally been necessary to return the crop residue treatment systems to effective use as impact chopping systems since the resulting converted constructions, even if operable at relatively slow speeds and for transporting straw through the combine with relatively little damage thereto, were generally not also efficiently operable at higher speeds to effect an adequate chopping of the crop residue such as would be required for different crops or in different situations. Such cumbersome and time consuming conversions have not generally been considered practical for the day to day use of harvesters.

Consequently, to this point in time, a single solution has not been available to address the seemingly disparate and conflicting desires of crop processor users and impact chopping system users, and different solutions have therefore been independently explored for the differing crop residue treatment systems. With respect to balers and their crop processors, it has been recognized that increased throughput can result in improved efficiency, but attempts to increase the throughput volume by increasing the operational speed of the rotary element have typically resulted in feeding difficulties and poor chop quality, as a consequence of which most crop processors in the industry have continued to be limited to operational speeds of about 100-300 RPM. With respect to combines, it has been recognized that, for some crops and crop conditions, a crop residue treatment system that would function more akin to a crop beater would be preferable to an impact chopping system, but attempts to develop such a system that can operate more slowly, such as for, among other things, purposes of fuel economy, and also to transport straw through the harvester for windrowing, with less chopping thereof, yet which can also efficiently operate to effect the finer, desired cut quality when the crop residue is to be distributed over a field, have often fallen short of desires and expectations.

It has now been found, however, that the inclusion and employment of a rotor tine and rotary element configuration of an improved design in both crop processors and impact chopping systems permits users thereof to realize in great part many of the advantages sought therefor, including increased efficiencies in the operations of such crop residue treatment systems, while overcoming and/or minimizing many of difficulties and disadvantages associated with the prior art constructions, as noted hereinabove.

SUMMARY OF THE INVENTION

What has now been developed and is disclosed herein is an improved crop residue treatment system that employs rotor tine and rotary element configurations of improved design that contribute to an overall improvement in and versatility of operation of the crop residue treatment system. Such system includes rotor tines on a rotor member and knife elements of a counter knife bank assembly that are so formed to interact as they pass one another to effect a better positioning of the crop reside for cutting action and an improved cut of the crop residue, primarily at a position along the rotor tine or knife element identified as the point of cut contact position.

In accordance with the present invention, such a system includes a rotary component or element generally positionable along and extending across a material flow path, typically on the top side thereof, which rotary element includes an elongated, preferably cylindrical, rotary member that has a longitudinal axis extending therethrough and about which axis the rotary member rotates, with a plurality of spaced rotor tines preferably distributed along the length and mounted or connected about the outer surface of the rotary member to define a predetermined patterned rotor tine array. A counter knife assembly is preferably, although not necessarily, spaced from the rotary element to define the material flow path between such rotary element and the counter knife assembly.

The improved rotor tine construction associated with the rotary element includes a base portion disposable generally adjacent to the outer surface of the rotary member and at least one rotor tine that includes a blade member having a projecting portion, with three distinct blunt edge portions, extending outwardly from the base portion. One of such blunt edge portions forms a trailing edge of the blade member and extends from a point B1 at the base portion of the blade member to a tip T at a height h of the rotor tine. The other two blunt edge portions form a leading edge on the blade member as it is rotated forwardly, both of which edge portions are preferably of a generally convex shape with one, the lower, of such blunt edge portions extending along the leading edge of the blade member from a point B2 at the base portion to an intersection point P along such leading edge, intermediate to point B2 and tip T of the blade member, preferably at least approximately, but not limited to, ⅔ of height h from the axis of the rotary member, and with the other, the upper, blunt edge portion extending along the leading edge from such intersection point P to the tip T of the blade member, with intersection point P forming a notch-like indentation along the leading edge of the blade member defined to be the point of cut contact position.

The rotor tines may be provided to be individually installable or mountable tine members, with a single rotor tine included in the rotor tine construction, or may be included as multiple tines in or upon a tine mounting assembly that is installable or mountable to the rotary member as a unit.

In one preferred tine mounting assembly embodiment, three rotor tines are formed with or mounted to a base sleeve portion that has an inner configuration or diameter sized to snugly fit about the outer configuration or diameter of the rotary member and to be mated thereto, with the three rotor tines being generally equidistantly spaced about the base sleeve portion and with point B1 associated with the trailing edge of a given rotor tine generally also forming point B2 associated with the leading edge of the adjacent rotor tine on the base sleeve portion. In such preferred embodiment, the lower portion of the leading edge preferably has a convex arc of radius r1 and the upper portion of the leading edge preferably has a convex arc of radius r2, where r2≧r1, although at least one of such portions may have an angled, concave, or other shape, if so desired by a user. For convenience of manufacture, the trailing edges of the rotor tines are preferably generally or approximately straight, but they may be any convenient form.

In accordance with one preferred crop residue treatment system embodiment, multiple tine mounting assemblies are preferably stackably mountable side-by-side to one another along the length of the rotary member, with adjacent tine mounting assemblies being offset relative to one another such that the rotor tines associated with the rotary member are disposed to define a desired array pattern, preferably a chevron-like arrangement.

With such a rotor tine configuration, when the knife elements of a counter knife assembly are retracted or no counter knife assembly is employed or present, as the rotary member is rotated forwardly while crop residue is flowing along the material flow path, the leading edges of the blunt edged tines contact the crop residue and serve to pull and push it past the rotary member and propel such crop residue rearwardly, but with little damage to or cutting of such residue, especially if the rotary member is rotating at a relatively low speed. Due to the configuration of the rotor tines, as crop residue stalks flow towards the rotary element they are contacted by the rotor tines and tend to slide along the leading edges thereof towards point P to be at least partially contained thereat by the notching of the leading edge and to be more horizontally aligned as they continue rearwardly, including by the rotational movement of the rotor tines about the rotary member. As the stalks continue to move rearwardly, including due to the centrifugal force imparted thereto by the rotation of the rotor tines, the stalks tend to slide along and off the leading edges of the rotor tines as the rotor tines rotate with the rotary member.

If a counter knife assembly is employed and such counter knife assembly is configured with the knife elements thereof projecting sufficiently into the material flow path to be contacted by the crop reside as it flows between the rotary element and the counter knife assembly, stalks will similarly be contacted by the rotor tines and tend to slide along the leading edges thereof towards point P to be at least partially contained thereat by the notching of the leading edge and to be more horizontally aligned as they continue rearwardly, including by the rotational movement of the rotor tines about the rotary member. As the stalks continue to move rearwardly they are moved by the leading edges into contact with the knife elements of the counter knife assembly to be shear cut by such knife elements. Due to the configuration of the rotor tines, because the stalks are more horizontally aligned relative to the knife elements of the counter knife assembly than would be the case with prior art constructions, the resulting shear cuts are generally shorter and less diagonal across stalks, resulting in lessened system loading, and the resultant cut stalks are generally of a more uniform length. As the shear cut stalks continue to move rearwardly, including due to the centrifugal force imparted thereto by the rotation of the rotor tines, they tend to slide along and off the leading edges of the rotor tines as the rotor tines rotate with the rotary member.

If the rotary element is operated at relatively low rotational speeds, minimal chopping results from the impact of the rotor tines with the crop residue due to the blunt edges of such rotor tines. On the other hand, if the rotary element is operated at higher rotational speeds, the impact of the rotor tines upon the crop residue stalks results in some greater damage thereto at the points of contact, in the form of pulverization or impact chopping by the blunt edges of the rotor tines. Although the resulting chop may not be as complete or extensive as the chop that may ideally be able to be attained by the use of the prior art integral chopper systems, because of the more horizontal positioning of the stalks relative to both the rotor tines and the knife elements of the counter knife assembly, and the consequent shorter cuts required across the stalks, as well as the lessened system loading realizable due to the rotor tine configuration, good chop quality can still be achieved, even at speeds lower than those typically required for prior art impact chopping systems.

Such rotor tine and rotary element configurations thus contribute to an overall improvement in and versatility of operation of crop residue treatment systems of various designs, including both crop processors and impact chopping systems, and permit users thereof to realize in great part many of the advantages sought therefor, including increased efficiencies in the operations of such crop residue treatment systems, while overcoming and/or minimizing many of difficulties and disadvantages associated with the prior art constructions, as further described and discussed in greater detail hereinafter.

DETAILED DESCRIPTION OF THE INVENTION

Figure 1:
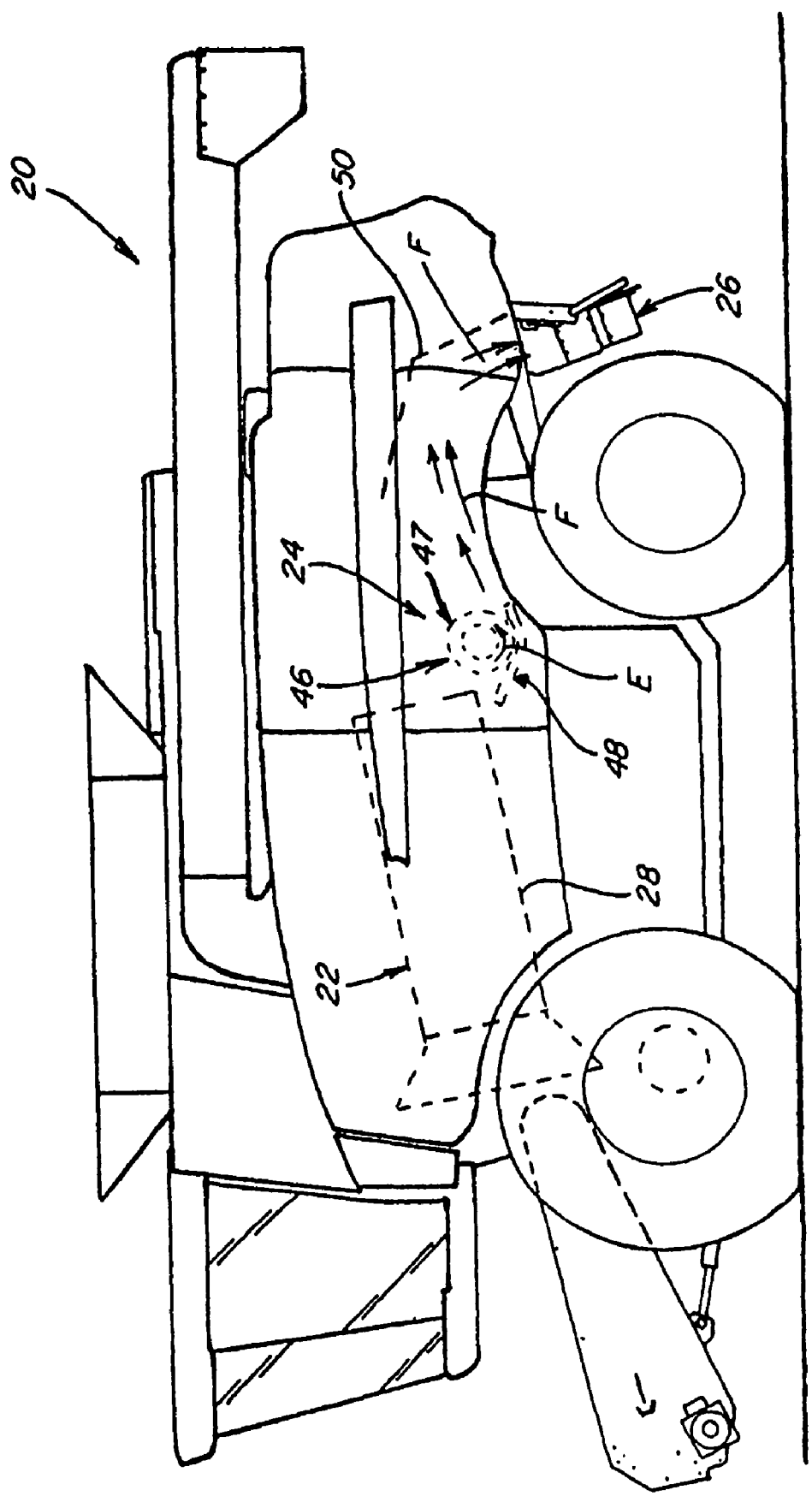
FIG. 1 is a simplified side plan view, from the left side, of an agricultural combine, illustrating, in dotted outline, an axially arranged threshing system of the combine and an improved integral chopper assembly of the residue treatment and distribution system of the combine that includes the present invention.
Figure 2:
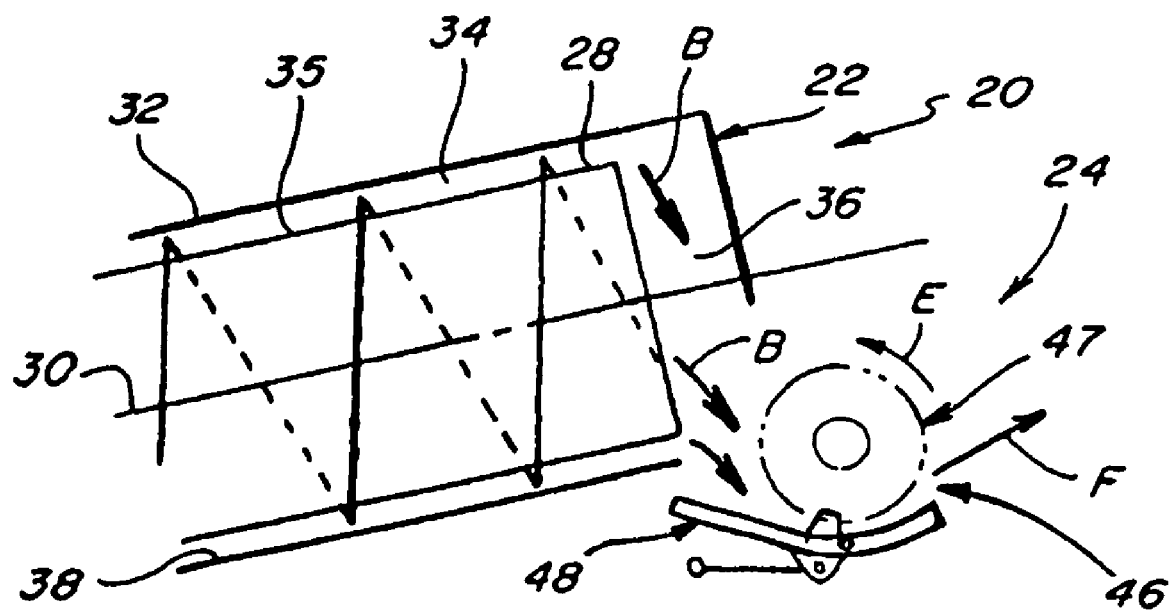
FIG. 2 is a simplified side plan view, from the left side, of the threshing system and a portion of the crop residue treatment and distribution system of the combine of FIG. 1, further illustrating the flow of crop residue to and through the integral chopper assembly.

Referring now to the drawings, wherein preferred embodiments of an improved integral chopper assembly that includes the present invention are shown, wherein like numerals refer to like items, wherein certain elements and features may be labeled or marked on a representative basis without each like element or feature necessarily being individually shown, labeled, or marked, and wherein certain elements are labeled and marked in only some, but not all, of the drawing figures, FIGS. 1 and 2 depict a representative agricultural combine 20 that includes a longitudinally axially arranged threshing system 22 and a crop residue treatment and distribution system 24 with a crop residue spreader 26, all of which, except for the improved integral chopper system that is the subject hereof and which is included within the crop residue and distribution system 24, are of well known construction and operation.

As can be generally and essentially observed from a review and study of FIGS. 1-2, threshing system 22 is axially arranged in that it includes a cylindrical threshing rotor 28 conventionally supported and rotatable in a predetermined, typically clockwise direction, about a rotational axis 30 therethrough and within a concave 32 (FIG. 2), for conveying a flow of crop material in a helical flow path through a space 34 extending circumferentially around an outer cylindrical surface 35 of rotor 28 and an inner circumferential surface 38 of concave 32. As the crop material is moved through space 34, the crop, such as grain, legumes, or the like, will be loosened and separated from crop residue such as husk and pods, and carried away therefrom in the well known conventional manner.

As may be best illustrated by FIG. 2, the crop residue will continue along a helical path through space 34, and will be expelled therefrom, as denoted by arrows B, into and through a discharge opening and passage 36, which essentially comprises an extension of space 34 at the downstream end of threshing rotor 28. The consistency of the flow of crop residue, volume thereof, and extent or pattern thereof, will typically vary, and be a function of a variety of conditions, including, but not limited to, the speed of rotation of rotor 28, crop type, plant maturity, moisture content, and weather conditions. As an example, rotor speeds can vary between just a few hundred RPM and over 1000 RPM. Wheat and other small grains will typically have relatively small crop residue components, whereas other grains, such as corn, will typically have larger components, such as thick stalk segments, cob fragments, and large leaves.

Crop residue treatment and distribution system 24 will typically include a transport and chopping assembly, such as integral chopper assembly 46, sometimes hereinafter referred to as rotary assembly 46 having a rotary chopper element 47 rotatable in a direction E above a concave pan assembly such as chopper grate assembly 48. As rotary chopper element 47, sometimes referred to more simply as rotary element 47, rotates it acts to accelerate and propel a flow of crop residue rearwardly within the confines of the rear end of combine 20, as generally denoted by arrows F. Such rearward flow is typically guided and directed by internal panels or shields, generally denoted by shields 50 (FIG. 1), so as to either flow through a rear opening so as to be deposited directly onto a field, such as in a windrow, or flow into a secondary crop residue chopper and/or spreader, such as chopper/spreader 26, for spreading thereby in a swath on the field.

In the further discussion of these and other drawings and the elements shown therein, it should be understood and appreciated that, for purposes of clarity in various of such drawings, pluralities of generally like elements positioned near to one another or extending along some distance may sometimes, if not often, be depicted as one or more representative elements with extended phantom lines indicating the general extent of such like elements. In such instances, the various elements so represented may generally be considered to be generally like the representative element depicted and generally operable in a like manner and for a like purpose as the representative element depicted.

Figure 3:
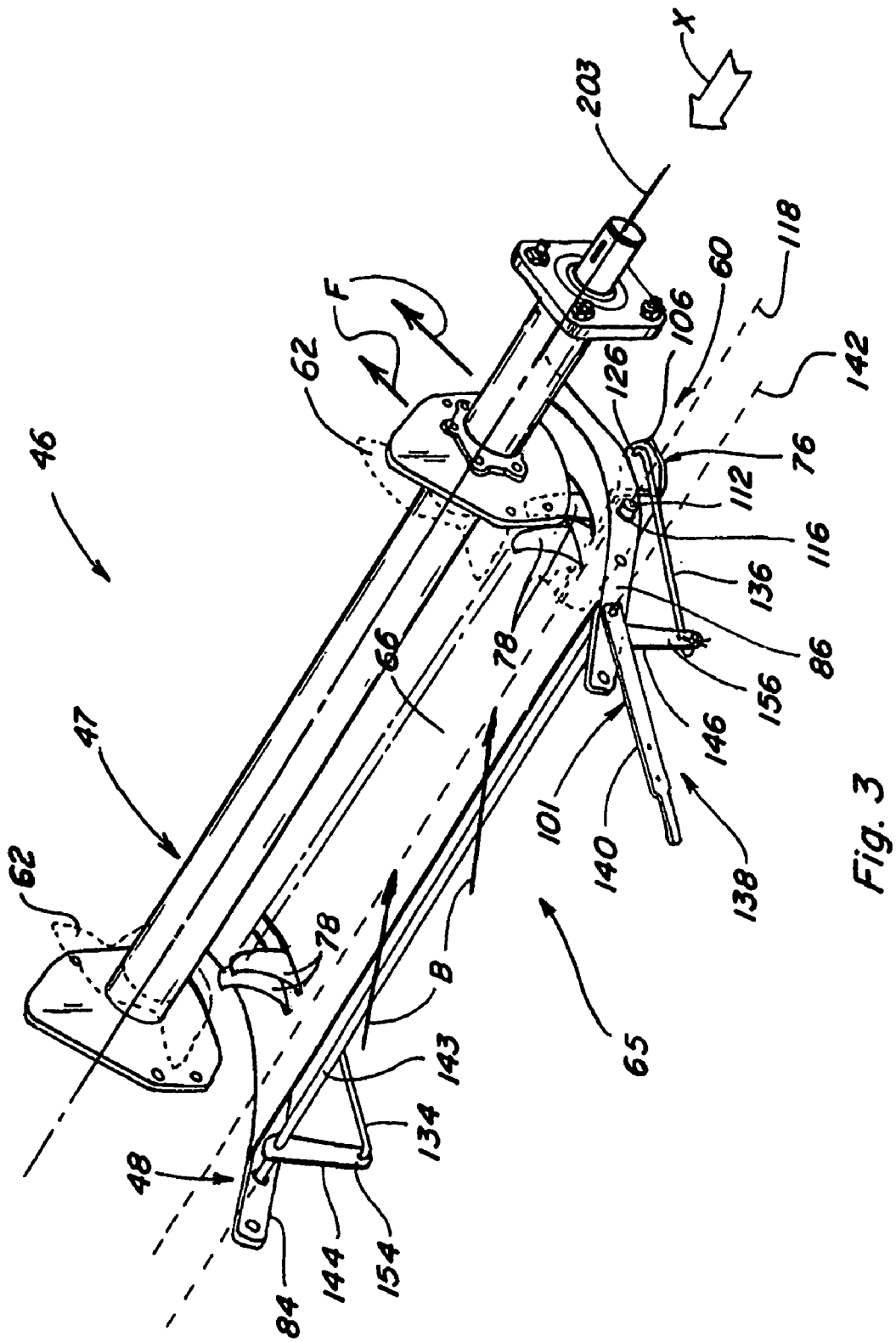
FIG. 3 is a perspective view, from the left front side of a chopper assembly, generally depicting a representative embodiment of a counter knife assembly of the integral chopper assembly of FIGS. 1 and 2, wherein, for purposes of clarity, rotor tines on the rotary chopper element of the integral chopper assembly are shown in dotted outline only and phantom lines along the central portions of the rotary chopper element and the grate assembly should be considered to include therealong various components, representative components of which are depicted to the outer sides thereof.
Figure 4:
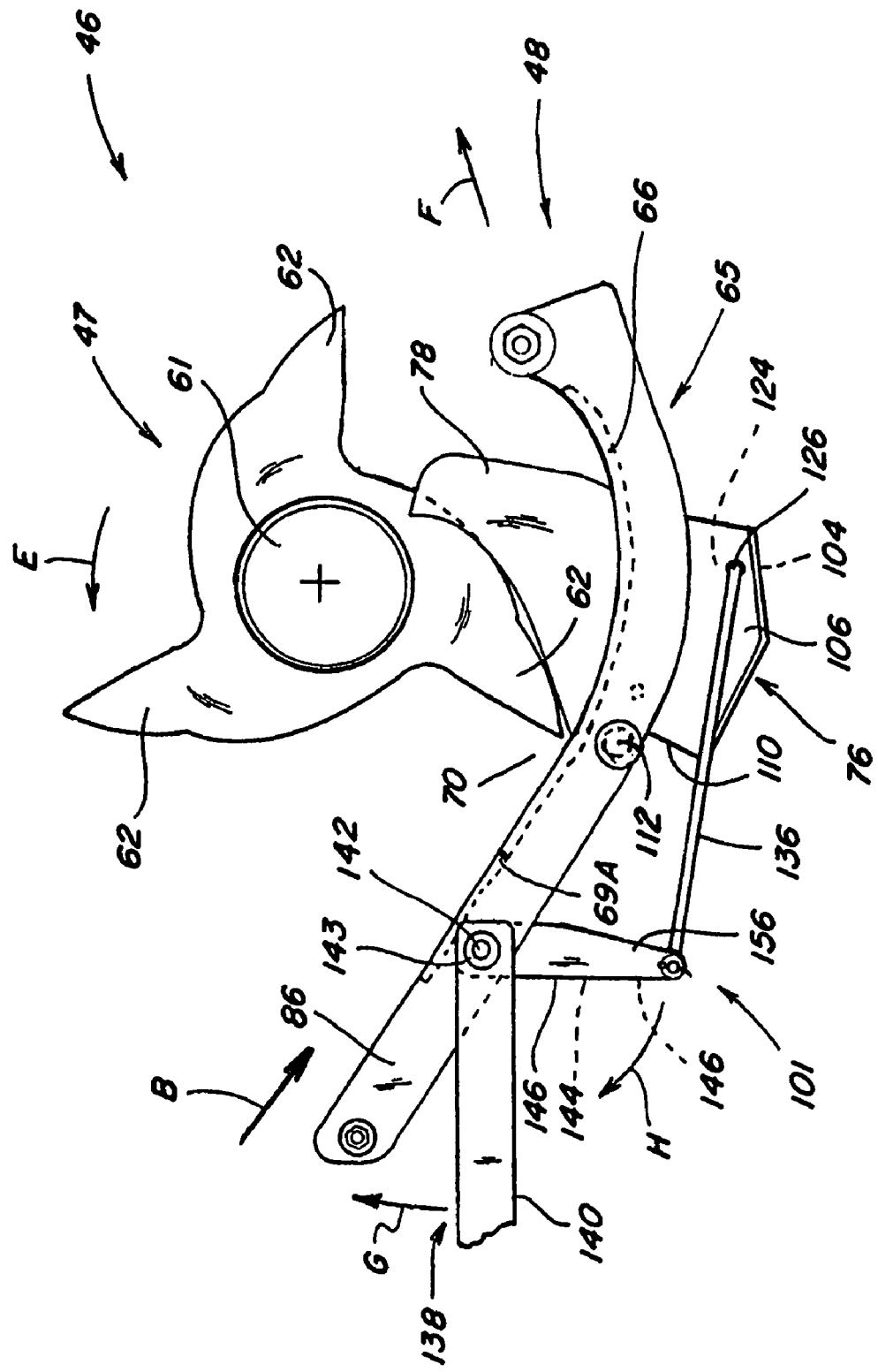
FIG. 4 is a simplified left side plan view, generally viewed from position X in FIG. 3, of a portion of the integral chopper assembly of FIG. 3, including the counter knife assembly thereof.

With such thoughts in mind, FIGS. 3-4 depict generally a portion of an integral chopper assembly 46 according to the present invention that includes a rotary chopper portion or element 47 that extends generally horizontally across the flow path of the crop residue above a chopper grate assembly 48 that includes as a portion thereof the counter knife assembly 60. The rotary chopper element 47 includes a cylindrical element or like rotary member 61, and has a number of rotor tines 62 disposed thereabout, only representative ones of which rotor tines 62 are individually depicted in FIGS. 3 and 4, mounted or affixed thereto at a plurality of mounting locations distributed about its periphery. The particular positionings, arrangements, and configurations of such plurality of rotor tines 62, which are considered of significance with respect to the current invention, will be addressed further hereinafter.

Figure 5:
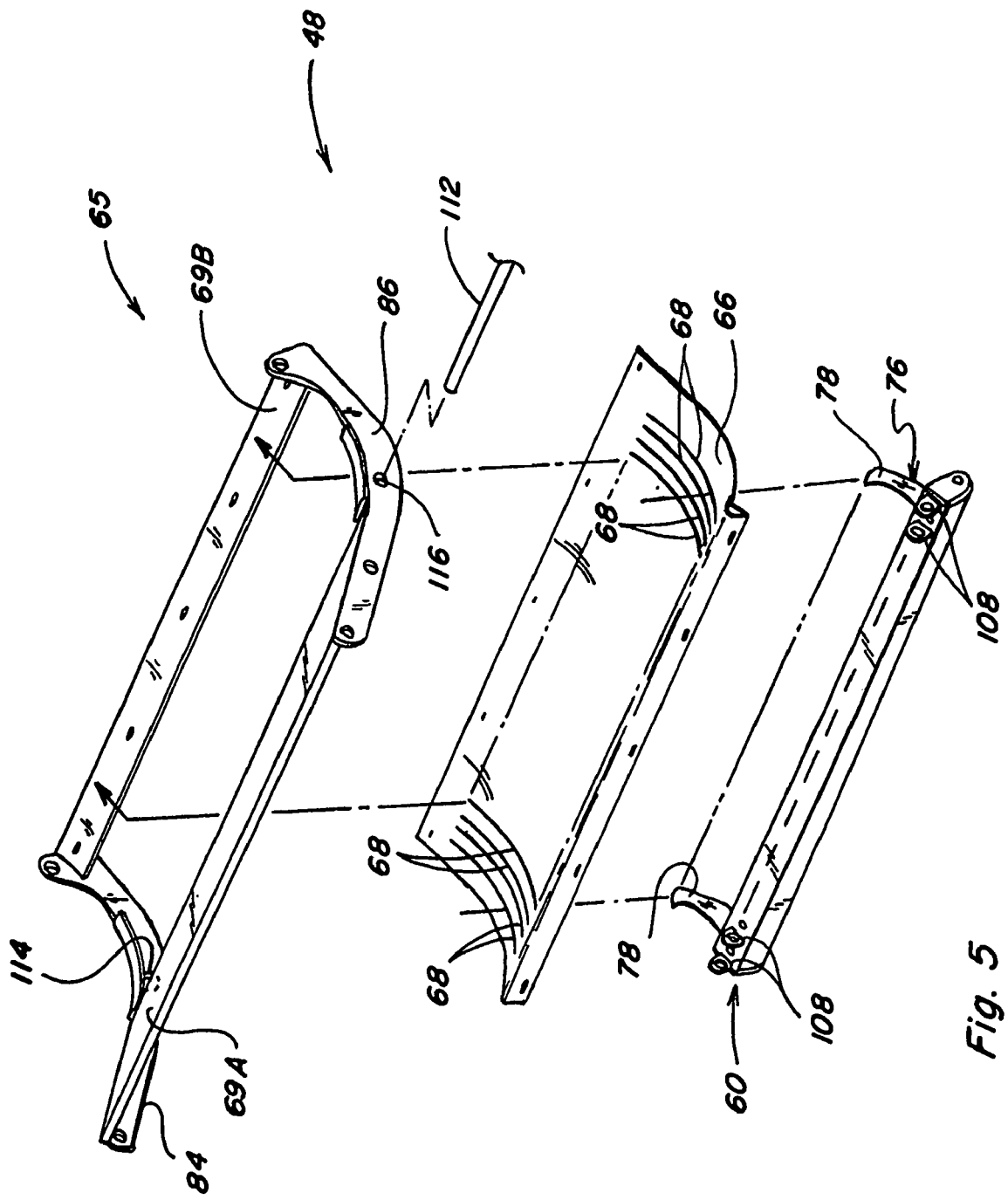
FIG. 5 is an exploded perspective view of various portions of the concave pan portion of the integral chopper assembly of FIGS. 3 and 4.

FIG. 5 depicts in an exploded view various components of the chopper grate assembly 48 of the integral chopper assembly 46, including a generally concave pan portion 65, sometimes hereinafter also referred to as a concave pan assembly. Such concave pan portion 65 includes a grate portion 66 that extends generally parallel to the rotary chopper element 47 (as better shown in FIG. 3) with a plurality of spaced slots 68 therealong, the purpose and configurations of which slots 68 will be further addressed hereinafter, disposed between leading and trailing plate portions 69A and 69B. For purposes of clarity, not all of the slots in the grate portion 66, including especially a plurality of slots along and/or within the phantom lines in the central portion of the grate portion 66, are depicted in FIGS. 3 and 5.

As will be appreciated by those skilled in the art, the grate portion 66 and the leading and trailing portions 69A and 69B of the chopper gate assembly 48 have often in the past been welded together as part of the larger component concave pan portion 65. In the particular embodiment depicted in FIG. 5, however, such components 66, 69A, and 69B are shown as separate elements that may be matably joined together with one another to form the concave pan portion 65.

As may now be better observed from FIG. 4, rotary chopper element 47 and grate portion 66 of concave pan portion 65 of chopper grate assembly 48 define a passageway 70 therebetween for the crop residue flow that is directed to the integral chopper assembly 46 for treatment thereby, such as crop residue flow B from the threshing system 22 (FIG. 2). The slots 68 in grate portion 66 are generally elongated and extend along such grate portion 66 generally in the direction of the crop residue flow B.

With reference, now, to all of FIGS. 3-5, counter knife assembly 60 includes a stationary knife bank 76 positioned generally beneath and parallel to both rotary chopper element 47 and grate portion 66, having a plurality of spaced knife elements 78 therealong. Such knife elements 78 are mounted at positions along knife bank 76 generally alignable with slots 68 in grate portion 66 that are coordinately sized and configured to permit the knife elements 78 to be movable to project through slots 68.

Slots 68 and knife elements 78 are appropriately positioned relative to rotor tines 62 of rotary chopper element 47 to permit the knife elements 78 and rotor tines 62 to be interengagable with one another, especially as rotary chopper element 47 is rotated, so as to pass adjacent to one another without contacting one another. Such rotor tines 62 and knife elements 78 are so mounted that they are interengageable with one another during a chopping operation without contacting or interfering with one another.

With reference again to FIGS. 3-4, the integral chopper assembly 46 therein depicted also preferably includes an adjustment mechanism 101 for adjustably varying the positioning of the knife bank assembly 76 relative to the grate portion 66 of the chopper grate assembly 48 between a fully engaged position wherein the knife elements 78 of the knife bank assembly 76 alignedly extend through the slots 68 of the grate portion 66 of the chopper grate assembly 48 at maximal projection and a fully retracted position wherein the knife elements 78 project minimally, if at all, through the slots 68. In such embodiment, knife bank 76, which extends between first and second knife bank end plates 104 and 106 thereof, with knife bank end plate 104 being behind and obscured by knife bank end plate 106 in FIG. 4, is generally spaced from and parallel to both rotary chopper element 47 and grate portion 66, extending in a journalled arrangement between opposed side wall or plates 84 and 86 of the concave pan portion 65, with side wall 84 being behind and obscured by side wall 86 in FIG. 4.

As shown in FIGS. 4-5, the counter knife bank 76, which is dimensioned to extend generally the width of the grate portion 66 between knife bank end plates 104 and 106, includes spaced mounting eyelets 108, including additional eyelets represented as being disposed along the phantom line between the representative eyelets 108 depicted in FIG. 5, along a side 110 thereof through which a shaft member 112 extends between journalled end connections 114 and 116 on the respective opposed side plates 84 and 86 of concave pan portion 65. Such shaft member 112, when so mounted through journalled end connections 114 and 116, defines an engagement positioning axis 118 (FIG. 3), sometimes hereinafter also referred to as swivel axis 118, about which knife bank 76 can be rotated in an arc-like movement.

Knife bank end plates 104 and 106 also include lower portions 124 and 126, with portion 124 being behind and obscured by portion 126 in FIG. 4, which are operatively connected, as better shown in FIG. 3, via respective positioning rods 134 and 136 to a lever assembly 138 which is operable to effect, through the coupled movement of positioning rods 134 and 136, a rotation of knife bank end plates 104 and 106 and the knife bank 76 journalled thereto about swivel axis 118, the consequence of which is the retraction of the knife elements 78 from the flow passageway 70 (FIG. 4). Lever assembly 138 includes an operable lever 140 coupled at axis 142 to a rotatable connecting rod 143 that extends between side plates or walls 84 and 86 of concave pan portion 65, which connecting rod 143 is attached to support links 144 and 146. Support links 144 and 146 are respectively connected to positioning rods 134 and 136.

With further reference to both FIGS. 3 and 4, when lever 140 is operated, as denoted by arrow G in FIG. 4, support links 144 and 146 are caused to rotate thereby effecting rotational movement of end portions 154 and 156 of support links 144 and 146 about axis 142, as denoted by arrow H in FIG. 4, consequent movement of positioning rods 134 and 136, and the resultant rotational movement of the knife bank assembly 76, including knife bank end plates 104 and 106, about swivel axis 118. By thus operating, and then fixing the status of lever assembly 138 at a given position, a user can conveniently alter and fix the positioning of the knife bank 76 relative to grate portion 66, thereby controlling to some extent the amount by which the knife elements 78 are allowed to project through slots 68.

The ability to effect a repositioning of the knife bank 76 relative to grate portion 66 is beneficial in circumstances where a user finds it desirable to be able to withdraw or retract the knife elements 78 of the counter knife assembly 60 from the flow passage 70, such as to clear obstructions as well as in circumstances where the user wishes to adjust the quality of the chop. Typically, the greater the amount of projection, the finer the chop, and the less the amount of projection, the coarser the chop.

It will be understood and appreciated by those skilled in the art that, although the position of knife bank 76 in the embodiment of FIGS. 3-4 is shown controlled by the operation of a lever assembly 138 and associated linkages, various other mechanisms and devices could equally as well be utilized to control the positioning of positioning rods 134 and 136 or, more directly, the swivel positioning of knife bank end plates 104 and 106, or even the placement of knife bank 76 closer or farther from grate portion 66. Such mechanisms and devices may be manually or automatedly operable, including remotely by a user, such as from the cab of a combine, and may include various and sundry systems and components of well known construction for effecting the desired movements, placements, or positionings.

It has now been discovered that improved and more efficient operation can be achieved by the use of rotor tines and rotary element configurations of improved design, including the distribution of the rotor tines of improved design in a preferred array about the rotary member 61 of rotary element 47.

As has been noted hereinbefore, in many previous integral chopper assembly constructions, the rotor tines had been disposed on the rotary member 61 in rows and columns, though sometimes in differing array configurations. It has now been found that, with the improved rotor design as addressed herein, even better performance and throughput, especially when the system may be operated in dual or alternative residue transport modes, as discussed hereinabove, can be realized by mounting or affixing the rotor tines about the rotary member to define a chevron-type arrangement.

With reference to the foregoing, it has been found preferable, in order to facilitate not only the improved rotor design, but also such noted mounting and distribution, that a plurality of rotor tines be formed with or mounted upon and around a plurality of generally similar tine mounting assemblies, preferably in the form of tine sleeve assemblies, which can be readily disposed in an ordered, or stacked, side-by-side arrangement along the longitudinal axis of the rotary member 61, with adjacent tine sleeve assemblies being rotationally offset from one another about the longitudinal axis of rotary member 61 to define the chevron-type arrangement of the rotor tines 62 about the rotary member 61.

Figure 6:
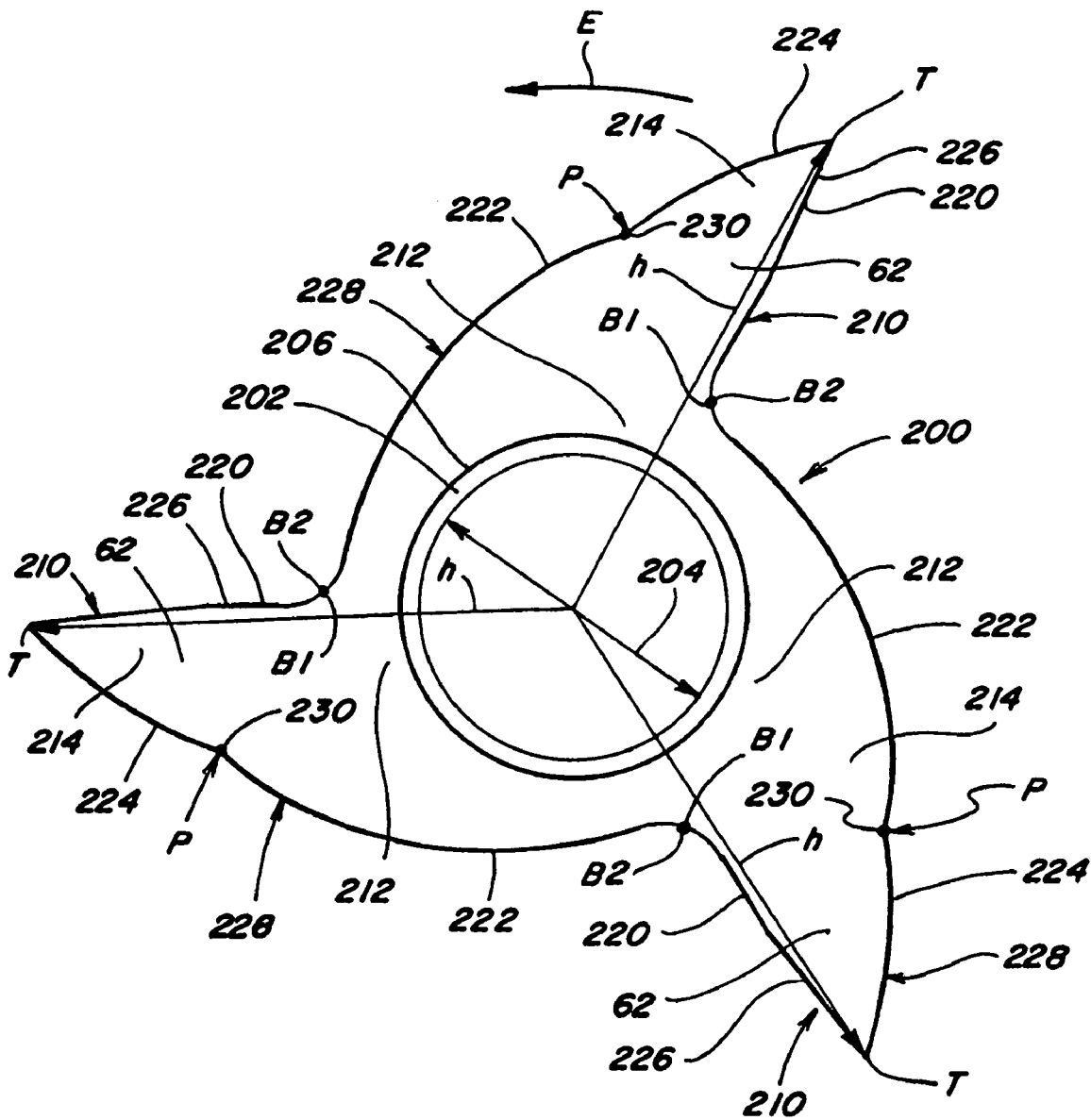
FIG. 6 is an end plan view of a preferred tine sleeve assembly according to the present invention, including three rotor tines disposed therearound.

In such regard, FIG. 6 depicts a preferred tine sleeve assembly 200 that has a base sleeve portion 202 that has an inner configuration or diameter 204 sized to snugly fit about the rotary member 61 and to be fixed in position relative to the rotary member 61, such as by mating or mounting of such tine sleeve assembly 200 to rotary member 61, which mating or mounting can be effected by any suitable connection apparatus or in any suitable manners. Three generally like rotor tines 62 are formed therewith or mounted thereto to be generally equidistantly radially spaced about the outer surface 206 of the base sleeve portion 202 and to extend outwardly therefrom.

The individual rotor tines 62 associated with each base sleeve portion 202 each include a blade member 210 having a base portion 212 and a projecting portion 214 extending outwardly therefrom, with three distinct blunt edge portions 220, 222, and 224. Blunt edge portion 220 forms a trailing edge 226 of the blade member 210 as the blade member 210 rotates forwardly, as shown by arrow E, and extends from point B1 at base portion 212 of blade member 210 to tip T of blade member 210, at a height h. The other two blunt edge portions 222 and 224 form a leading edge 228 on blade member 210 as it is rotated forwardly. Both of such edge portions 222 and 224 are preferably of a generally convex shape, with the lower blunt edge portion 222 extending along the leading edge 228 of blade member 210 from point B2 at base portion 212 to intersection point P along such leading edge 228, preferably located along the leading edge 228 of blade member 210 at least approximately ⅔ of the height h of rotor tine 62, and with the upper blunt edge portion 224 extending along the leading edge 228 from such intersection point P to the tip T of blade member 210. Intersection point P thus forms a notch-like indentation 230 along leading edge 228 of blade member 210. For each of such individual rotor tines 62, point B1 associated with the trailing edge 226 generally also forms point B2 associated with the leading edge 228 of the adjacent rotor tine 62 on the base sleeve portion 202.

In the preferred embodiment depicted in FIG. 6, the lower portions 222 of the leading edges 228 of the rotor tines 62 each have a convex arc of radius r1 and the upper portions 224 of the leading edges 228 each have a convex arc of radius r2. Such convex shapes and effected notching of the leading edges 228 at points P along such leading edges 228 approximately, but not limited to, ⅔ of the height h of rotor tines 62 serve, as the rotary member 61 is rotated forwardly, to draw the crop residue contacted by the rotor tines 62 towards point P along such leading edges 228.

The convex shapes of the lower portions 222 tend to draw the crop residue along and up the leading edges 228 towards the axis of rotation of the rotary member 61, and towards the point of cut positions at intersection points P, while the convex shapes of the upper portions 224 tend to force the crop residue along and down the leading edges 228 away from the axis of rotation of the rotary member 61, and also toward the point of cut positions at intersection points P. The effect is the generation of a two directional flow of crop residue along such leading edges 228 towards intersection points P to concentrate the crop residue thereat, which results in improved feeding and cutting of the crop residue as such concentrated crop residue is moved past the knife elements 78 of the counter knife assembly 48.

Positioning such convex arcs to intersect to establish intersection points P along leading edges 228 at approximately, but not limited to, ⅔ of the height h of the rotor tines 62 has been found preferable in that the establishment of the point of cut position at such a location permits the feed rate for the rotary element 47 to be increased while maintaining the convergence area sufficiently distanced from the axis of rotation of rotary member 61, the effect of which is to optimize the cutting action of the crop residue treatment system by concentrating forces along the outer portion of the radius of the rotary element 47 and thus effecting a reduction in power consumption during the shear cutting action.

For convenience of manufacture, the trailing edges of the rotor tines are preferably generally straight, but they may be any convenient form.

Figure 7:
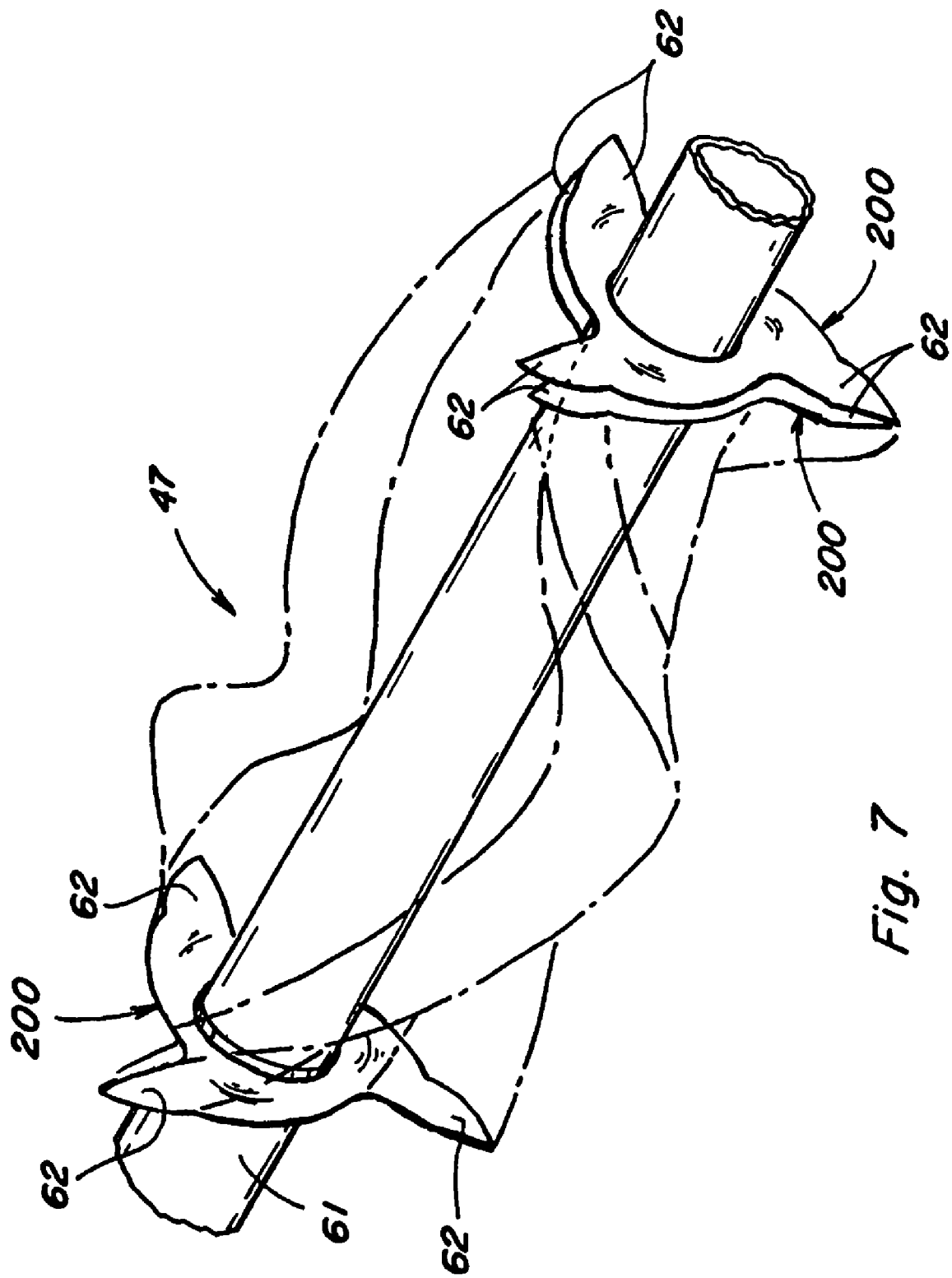
FIG. 7 is a perspective view of the rotary member of FIG. 3, depicting a preferred rotor tine arrangement therewith, with a plurality of generally like preferred tine sleeve assemblies axially stacked side-by-side along the longitudinal axis of the rotary member and offset relative to one another to define a chevron-like arrangement for the rotor tines, as indicated by the dashed lines extending between the outermost tine sleeve assemblies along the rotary member.
Figure 8:
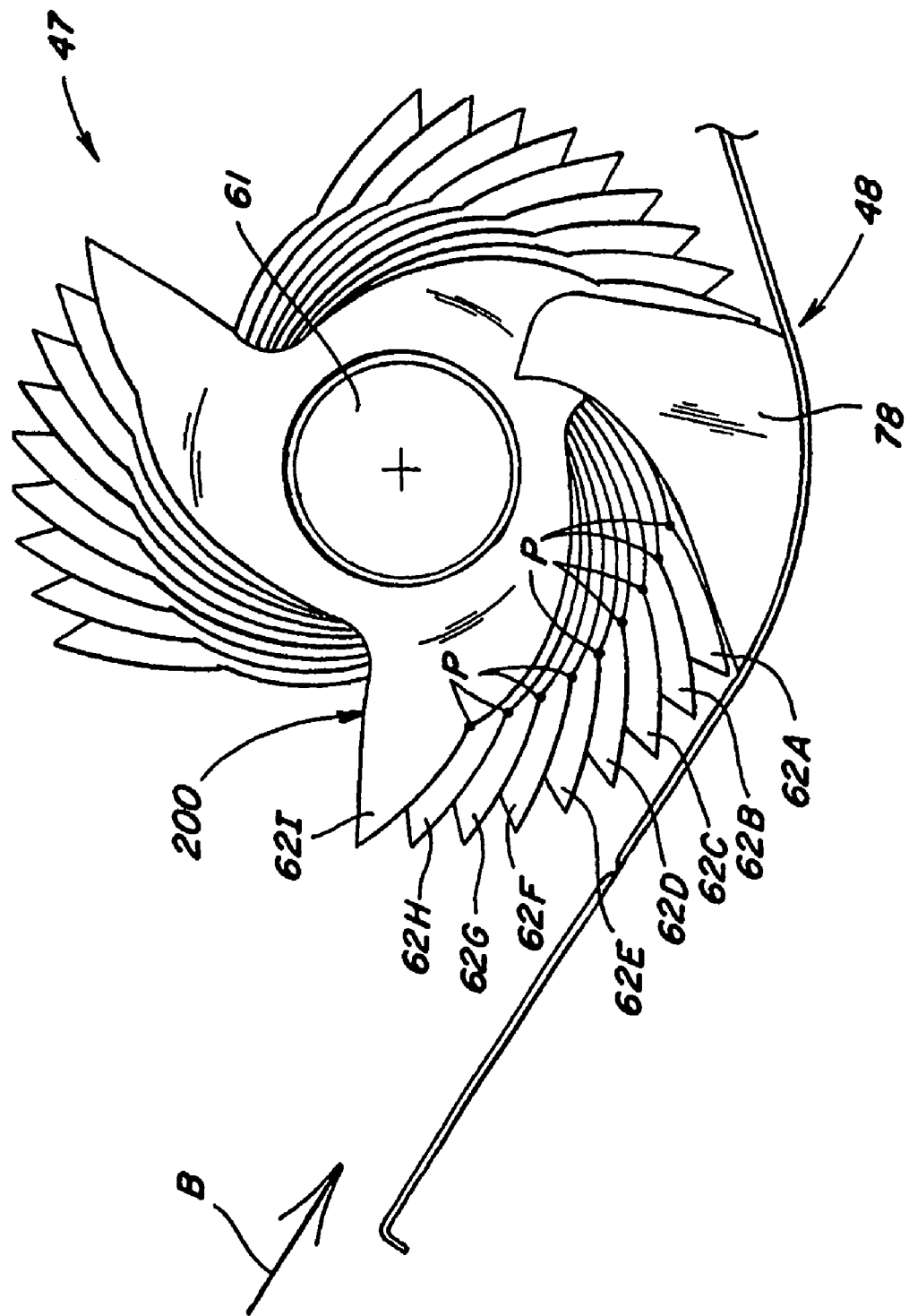
FIG. 8 is an end plan view of the rotary element depicted in FIG. 6, illustrating the staggered interaction of the rotor tines associated with the tine sleeve assemblies of FIG. 7 with knife elements of the counter knife assembly.

As best illustrated in FIGS. 7-8, a plurality of tine sleeve assemblies 200 may be mounted in an ordered, or stacked side-by-side, arrangement, along rotary member 61 to dispose and position a plurality of rotor tines along and about rotary member 61. The tine sleeve assemblies may be offset from one another as mated or mounted to the rotary member 61 such that a desired rotor tine pattern or array is provided along and about the rotary member 61. The particular pattern as illustrated by the dashed lines in FIG. 7 is in the form of a chevron, which pattern has been found preferable in that the cutting actions along the rotary element 47 may be staggered to some extent, rather than being more concentrated such as might be the case if the rotor tines 62 were aligned in a row pattern generally aligned with the axis of the rotary member 61.

In such regard, FIG. 8 depicts the rotary element 47 and a portion of the counter knife assembly 48, showing in better detail the staggered fashion in which the rotor tines 62 interengage with the knife elements 78 to effect the shear cutting of the crop residue as the crop residue is moved past such knife elements 78. As may be observed, the points P of rotor tines 62A-62I, and any stalk or other crop residue concentrated thereat, rotate past the stationary knife elements 78 of counter knife assembly 48 in a sequential, staggered fashion so that the cutting actions associated with the rotor tines 62A-62I as they rotate past knife elements 78 will also be staggered in time, as a consequence of which a more uniform, or averaged, system loading, and typically with lower peak loads, can be realized instead of a system loading that experiences a more cyclical peak and valley loading operation. As a result, greater system efficiency can be realized at slower rotational speeds.

While the foregoing detailed discussion has been principally directed to a crop residue treatment system that includes a counter knife assembly, various advantages related to the more efficient transport of crop residue can be achieved by the use and practice of this invention even in the absence of a counter knife assembly, and the use of or inclusion of a counter knife assembly within or as part of a crop residue treatment system should therefore not be considered necessary for the practice or use of this invention.

In addition, although the foregoing detailed discussions have been presented with particular reference to integral chopper assemblies, it should be understood and appreciated that the present invention is not intended to be and should not be considered to be limited to use or practice in or with integral chopper assembles or systems, but can also be practiced and used in or with other types of crop residue treatment systems, including crop processors, such as may be employed with balers, as well as hood mount chopping systems, such as may be employed with various combines and related equipment. Accordingly any references herein or in the claims which follow to chopper assemblies or chopper systems are generally intended to be broadly treated and not limited to integral chopper assemblies or systems.

Moreover, although the rotor tines in the foregoing detailed discussion have been described as having generally blunt trailing and leading edges, it should be appreciated that, particularly when intended for use in or with impact chopping systems, rotor tines of like design and configuration, but with sharpened, scalloped, or serrated edges, could be readily employed, though perhaps at some expense of being able to as effectively utilize such chopping systems for windrowing actions.

In light of all the foregoing, it should thus be apparent to those skilled in the art that there has been shown and described an improved crop residue treatment system that includes various features and components, including especially the rotor tine and rotary element configurations described hereinabove, that function to provide the advantages sought therefor. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the crop residue treatment system and of the invention that forms a part thereof, it should further be understood that concepts of the invention., as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A rotor tine construction for a crop residue treatment system that includes a rotary element extending generally longitudinally across a material flow path passing thereby through which crop material pieces, including lengths of crop residue, are moved, the rotary element including an elongated rotary member having a longitudinal axis extending therethrough and being rotatable about said longitudinal axis, the rotary member including an outer surface to and along which a plurality of individual rotor tines can be positioned in a rotor tine array, comprising
 a base portion disposable generally adjacent to the outer surface of the rotary member and mountable to fix the position of said base portion relative to the rotary member,
 at least one rotor tine including a blade member having a projecting portion extending outwardly from said base portion to a tip T at a height h from the axis of the rotary member,
 said projecting portion including three distinct blade edges,
 one of said blade edges forming a trailing edge on said blade member as the rotary member is rotated forwardly and extending from a point B1 at said base portion to said tip T of said blade member,
 the other two of said blade edges being upper and lower edge portions forming a leading edge along said blade member as the rotary member is rotated forwardly, said leading edge extending downwardly from tip T of said blade member towards said base portion,
 said lower edge portion extending from a point B2 at said base portion to intersect said upper edge portion at intersection point P spaced along said leading edge of said blade member between point B2 and tip T of said blade member, wherein the intersection point P is disposed approximately ⅔ of the distance from point B2 to T along the leading edge,
 said upper edge portion extending from said intersection point P to an intersection with said trailing edge at tip T of said blade member,
 said intersection point P defining a notch-like indentation along the leading edge of the blade member defined to be the point of cut contact position,
 whereby as the rotary member rotates forwardly said rotor tine is rotated through the material flow path and material contacted therein by said leading edge of said rotor tine is caused to move along said leading edge towards intersection point P to concentrate a length of crop residue near said intersection point P as said rotor tine rotates forwardly and to subsequently move centrifugally along and away from said leading edge as the rotor tine completes its rotation through the material flow path.

2. The rotor tine construction of claim 1 wherein said lower and upper edge portions have generally convex arcuate shapes generally adjacent said intersection point P.

3. The rotor tine construction of claim 2 wherein said intersection point P is at a position along said leading edge at least approximately ⅔ of height h from the axis of the rotary member.

4. The rotor tine construction of claim 3 wherein said lower edge portion has a convex arc of radius r1 generally adjacent said intersection point P.

5. The rotor tine construction of claim 4 wherein said upper edge portion has a convex arc of radius r2, where r2≧r1, generally adjacent said intersection point P.

6. The rotor tine construction of claim 2 wherein said lower edge portion has a convex arc of radius r1 generally adjacent said intersection point P.

7. The rotor tine construction of claim 2 wherein said upper edge portion has a convex arc of radius r2 generally adjacent said intersection point P.

8. The rotor tine construction of claim 1 wherein said leading and trailing edges of said blade member are generally blunt.

9. The rotor tine construction of claim 1 wherein said trailing edge of said blade member is generally straight.

10. The rotor tine construction of claim 1 wherein said intersection point P is at a position along said leading edge at least approximately ⅔ of height h from the axis of the rotary member.

11. The rotor tine construction of claim 1 wherein
 the crop residue treatment system also includes a counter knife assembly spaced from the rotary element to define therebetween the material flow path, the counter knife assembly including a grate portion positionable generally parallel to the rotary member and extending laterally across the material flow path, such grate portion having a plurality of slots therein, and a plurality of knife elements positionable to project through the slots of the grate portion to extend into the material flow path between the grate portion and said rotary member,
 as said rotary member is rotated about its longitudinal axis, each rotor tine of said rotary element rotates past the knife elements of the counter knife assembly with the knife elements of the counter knife assembly positioned extending through the slots of the grate portion into the material flow path, and
 each said rotor tine is operable as it rotates through the material flow path to concentrate a length of crop residue near said intersection point P and to move such length of crop residue to contact and be shear cut by the knife elements of the counter knife assembly as said rotor tine rotates past the knife elements.

12. The rotor tine construction of claim 1 including at least one tine mounting assembly installable upon said rotary member, said tine mounting assembly including a base mount portion, said base portion of said rotor tine construction including said base mount portion of said tine mounting assembly.

13. The rotor tine construction of claim 12 wherein said base mount portion of said tine mounting assembly includes a base sleeve portion that has an inner configuration sized to fit about the outer surface of the rotary member and to be fixed in position relative to the rotary member.

14. The rotor tine construction of claim 13 wherein the rotary member has a generally cylindrical shape with an outer diameter and said base sleeve portion has a generally tubular cross-section with an inner diameter corresponding to the outer diameter of the rotary member to be installable upon the rotary member to be complementarily engageable therewith.

15. The rotor tine construction of claim 14 wherein said tine mounting assembly includes a plurality of generally like rotor tines, said rotor tines being radially spaced from one another about said base sleeve portion.

16. The rotor tine construction of claim 15 wherein said point B2 of said leading edge of a rotor tine is also point B1 of said trailing edge of an adjacent rotor tine about said base sleeve portion.

17. The rotor tine construction of claim 13 wherein said construction includes a plurality of generally like tine mounting assemblies installable along said rotary member in an ordered side-by-side arrangement, said rotor tines of said tine mounting assemblies defining a rotor tine array about the rotary member.

18. The rotor tine construction of claim 17 wherein at least some of said tine mounting assemblies are rotationally offset from adjacent tine mounting assemblies about the rotary member.

19. The rotor tine construction of claim 17 wherein said rotor tine array is a chevron-like arrangement about the rotary member.

20. The rotor tine construction of claim 15 wherein
the crop residue treatment system also includes a counter knife assembly spaced from the rotary element to define therebetween the material flow path, the counter knife assembly including a grate portion positionable generally parallel to the rotary member and extending laterally across the material flow path, such grate portion having a plurality of slots therein, and a plurality of knife elements positionable to project through the slots of the grate portion to extend into the material flow path between the grate portion and said rotary member,
as said rotary member is rotated about its longitudinal axis, said rotor tines of said rotary element rotate past the knife elements of the counter knife assembly with the knife elements of the counter knife assembly positioned extending through the slots of the grate portion into the material flow path, and
said rotor tines are operable as they rotate through the material flow path to concentrate lengths of crop residue near their said intersection points P and to move such lengths of crop residue to contact and be shear cut by the knife elements of the counter knife assembly as said rotor tines rotate past the knife elements.

21. The rotor tine construction of claim 20 wherein
said leading and trailing edges of said blade member are generally blunt,
said trailing edge of said blade member is generally straight,
said intersection point P is at a position along said leading edge at least approximately ⅔ of height h from the axis of the rotary member,
said lower edge portion has a convex arc of radius r1 generally adjacent said intersection point P, and
said upper edge portion has a convex arc of radius r2 generally adjacent said intersection point P.

22. A crop processor for an agricultural machine comprising
a rotary element extending generally longitudinally across a material flow path passing thereby through which crop material pieces, including lengths of crop residue, are moved,
said rotary element including
an elongated rotary member having a longitudinal axis extending therethrough and being rotatable about said longitudinal axis, said rotary member including an outer surface to and along which a plurality of individual rotor tines can be positioned in a rotor tine array,
a rotor tine construction including
a base portion disposable generally adjacent the outer surface of the rotary member and mountable to fix the position of said base portion relative to the rotary member,
at least one rotor tine including a blade member having a projecting portion extending outwardly from said base portion to a tip T at a height h from the axis of the rotary member,
said projecting portion including three distinct blade edges,
one of said blade edges forming a trailing edge on said blade member as the rotary member is rotated forwardly and extending from a point B1 at said base portion to said tip T of said blade member,
the other two of said blade edges being upper and lower edge portions forming a leading edge along said blade member as the rotary member is rotated forwardly, said leading edge extending downwardly from tip T of said blade member towards said base portion,
said lower edge portion extending from a point B2 at said base portion to intersect said upper edge portion at intersection point P spaced along said leading edge of said blade member between point B2 and tip T of said blade member, wherein the intersection point P is disposed approximately ⅔ of the distance from point B2 to tip T along the leading edge,
said upper edge portion extending from said intersection point P to an intersection with said trailing edge at tip T of said blade member,
said intersection point P defining a notch like indentation along said leading edge of said blade member defined to be the point of cut contact position,
said leading and trailing edges of said blade member being generally blunt, and
a counter knife assembly spaced from said rotary element to define therebetween the material flow path, said counter knife assembly including
a grate portion positionable generally parallel to said rotary member and extending laterally across the material flow path, such grate portion having a plurality of slots therein, and
a plurality of knife elements positionable to project through said slots of said grate portion to extend into the material flow path between said grate portion and said rotary member,
whereby, forward rotation of said rotary member about its longitudinal axis effects a rotation of each rotor tine through the material flow path
to contact along said leading edge of such rotor tine lengths of crop residue in the material flow path,
to move such lengths of crop residue along said leading edge of such rotor tine to concentrate such lengths of crop residue near said intersection point P of such rotor tine,
to move such lengths of crop residue concentrated at said intersection point P of such rotor tine to contact and be shear cut by the knife elements of the counter knife assembly as such rotor tine rotates past the knife elements, and
to move such shear cut lengths of crop residue centrifugally along and away from said leading edge of such rotor tine as such rotor tine completes its rotation through the material flow path.

23. The crop processor of claim 22 wherein
said rotary member has a generally cylindrical shape with an outer diameter,
said rotor tine construction includes a plurality of tine mounting assemblies installable upon said rotary member, each said tine mounting assembly includes a base sleeve portion and a plurality of generally like rotor tines radially spaced from one another about said base sleeve portion, each said base sleeve portion has a generally tubular cross-section with an inner diameter corresponding to the outer diameter of the rotary member to be installable upon said rotary member to be complementarily engageable therewith and to be fixed in position relative to said rotary member, said base sleeve portions of said tine mounting assemblies being portions of said base portion of said rotor tine construction, and said base sleeve portions are installable along said rotary member in an ordered side by side arrangement with one another with at least certain adjacent base sleeve portions being rotationally offset from one another.

24. An integral chopper system for an agricultural combine comprising a rotary element extending generally longitudinally across a material flow path passing thereby through which crop material pieces, including lengths of crop residue, are moved, said rotary element including an elongated rotary member having a longitudinal axis extending therethrough and being rotatable about said longitudinal axis, said rotary member including an outer surface to and along which a plurality of individual rotor tines can be positioned in a rotor tine array, a rotor tine construction including a base portion disposable generally adjacent the outer surface of the rotary member and mountable to fix the position of said base portion relative to the rotary member, at least one rotor tine including a blade member having a projecting portion extending outwardly from said base portion to a tip T at a height h from the axis of the rotary member, said projecting portion including three distinct blade edges, one of said blade edges forming a trailing edge on said blade member as the rotary member is rotated forwardly and extending from a point B1 at said base portion to said tip T of said blade member, the other two of said blade edges being upper and lower edge portions forming a leading edge along said blade member as the rotary member is rotated forwardly, said leading edge extending downwardly from tip T of said blade member towards said base portion, said lower edge portion extending from a point B2 at said base portion to intersect said upper edge portion at intersection point P spaced along said leading edge of said blade member between point B2 and tip T of said blade member, wherein the intersection point P is disposed at ⅔ of the distance from point B2 to tip T along the leading edge, said upper edge portion extending from said intersection point P to an intersection with said trailing edge at tip T of said blade member, said intersection point P defining a notch like indentation along said leading edge of said blade member defined to be the point of cut contact position, and a counter knife assembly spaced from said rotary element to define therebetween the material flow path, said counter knife assembly including a grate portion positionable generally parallel to said rotary member and extending laterally across the material flow path, such grate portion having a plurality of slots therein, and a plurality of knife elements positionable to project through said slots of said grate portion to extend into the material flow path between said grate portion and said rotary member, whereby, forward rotation of said rotary member about its longitudinal axis effects a rotation of each rotor tine through the material flow path to contact along said leading edge of such rotor tine lengths of crop residue in the material flow path, to move such lengths of crop residue along said leading edge of such rotor tine to concentrate such lengths of crop residue near said intersection point P of such rotor tine, to move such lengths of crop residue concentrated at said intersection point P of such rotor tine to contact and be shear cut by the knife elements of the counter knife assembly as such rotor tine rotates past the knife elements, and to move such shear cut lengths of crop residue centrifugally along and away from said leading edge of such rotor tine as such rotor tine completes its rotation through the material flow path, and whereby, as the rotational speed of such rotary member is increased, contact of a leading edges with lengths of crop residue generally effects greater impact damage by such leading edge to such lengths of crop residue.

25. The integral chopper system of claim 24 wherein said rotary member has a generally cylindrical shape with an outer diameter, said rotor tine construction includes a plurality of tine mounting assemblies installable upon said rotary member, each said tine mounting assembly includes a base sleeve portion and a plurality of generally like rotor tines radially spaced from one another about said base sleeve portion, each said base sleeve portion has a generally tubular cross-section with an inner diameter corresponding to the outer diameter of the rotary member to be installable upon said rotary member to be complementarily engageable therewith and to be fixed in position relative to said rotary member, said base sleeve portions of said tine mounting assemblies being portions of said base portion of said rotor tine construction, and said base sleeve portions are installable along said rotary member in an ordered side by side arrangement with one another with at least certain adjacent base sleeve portions being rotationally offset from one another.

* * * * *